(12) United States Patent
Masuda (10) Patent No.: US 12,017,595 B2
(45) Date of Patent: Jun. 25, 2024

(54) BUMPER ATTACHMENT DEVICE

(71) Applicant: NIFCO INC., Yokosuka (JP)

(72) Inventor: Naoyuki Masuda, Yokosuka (JP)

(73) Assignee: NIFCO INC., Yokosuka (JP)

( * ) Notice: Subject to any disclaimer, the term of this patent is extended or adjusted under 35 U.S.C. 154(b) by 304 days.

(21) Appl. No.: 17/617,425

(22) PCT Filed: Jun. 23, 2020

(86) PCT No.: PCT/JP2020/024555
§ 371 (c)(1),
(2) Date: Dec. 8, 2021

(87) PCT Pub. No.: WO2020/262355
PCT Pub. Date: Dec. 30, 2020

(65) Prior Publication Data
US 2022/0219632 A1 Jul. 14, 2022

(30) Foreign Application Priority Data

Jun. 28, 2019 (JP) ................................ 2019-120816

(51) Int. Cl.
*B60R 19/24* (2006.01)
*F16B 5/06* (2006.01)

(52) U.S. Cl.
CPC ................ *B60R 19/24* (2013.01); *F16B 5/06* (2013.01)

(58) Field of Classification Search
CPC . B60R 19/24; B60R 19/023; B60R 2019/247; F16B 5/06; F16B 5/121; F16B 5/128; F16B 21/086
See application file for complete search history.

(56) References Cited

U.S. PATENT DOCUMENTS

| 7,793,998 B2 * | 9/2010 | Matsui | B60R 19/24 293/121 |
| 8,505,995 B2 * | 8/2013 | Meyers | B60R 19/24 296/29 |

(Continued)

FOREIGN PATENT DOCUMENTS

| DE | 102004038901 B3 * | 3/2006 | ............. B60R 13/04 |
| JP | 2003-191807 A | 7/2003 | |

(Continued)

OTHER PUBLICATIONS

PCT/ISA/210, "International Search Report for International Application No. PCT/JP2020/024555," Aug. 25, 2020.

(Continued)

*Primary Examiner* — Jason S Morrow
(74) *Attorney, Agent, or Firm* — HAUPTMAN HAM, LLP (57) ABSTRACT

A bumper attachment device for attaching a bumper face to a vehicle body includes a main portion, a vehicle body connection portion provided at the main portion and adapted to be connected to the vehicle body, and an elastic claw provided at the main portion and adapted to engage an engaging hole formed at the bumper face. The elastic claw extends from the main portion, and includes a beam having elasticity and a claw portion projecting from a tip portion of the beam to a side portion. The claw portion includes a check surface engaging a hole wall of the engagement hole, and the check surface has a dent and projection shape.

8 Claims, 8 Drawing Sheets

(56) References Cited

U.S. PATENT DOCUMENTS

| | | | |
|---|---|---|---|
| 9,033,381 B2 * | 5/2015 | Momii | B60R 19/24 |
| | | | 293/155 |
| 9,283,907 B2 * | 3/2016 | Farrington | B60R 19/18 |
| 11,524,646 B2 * | 12/2022 | Kotake | B60R 19/24 |
| 2014/0084609 A1 | 3/2014 | Momii et al. | |
| 2015/0028607 A1 | 1/2015 | Kojima et al. | |
| 2022/0227320 A1 * | 7/2022 | Sawano | B60R 19/24 |

FOREIGN PATENT DOCUMENTS

| | | | | |
|---|---|---|---|---|
| JP | 2006-219074 A | 8/2006 | | |
| JP | 4518406 B2 | 8/2010 | | |
| JP | 2013-169916 A | 9/2013 | | |
| JP | 2014-088112 A | 5/2014 | | |
| WO | WO-2011013195 A1 * | 2/2011 | | B60R 19/24 |
| WO | 2012/137627 A1 | 10/2012 | | |

OTHER PUBLICATIONS

China National Intellectual Property Administration, "Office Action for Chinese Patent Application 202080047062.1," Jan. 12, 2024.

* cited by examiner

BUMPER ATTACHMENT DEVICE

RELATED APPLICATIONS

The present application is National Phase of International Application No. PCT/JP2020/024555 filed Jun. 23, 2020, and claims priority from Japanese Application No. 2019-120816, filed Jun. 28, 2019, the disclosure of which is hereby incorporated by reference herein in its entirety.

FIELD OF THE INVENTION

The present invention relates to a bumper attachment device.

BACKGROUND OF THE INVENTION

A bumper attachment device for attaching a bumper face to a vehicle body is known (for example, Patent Document 1). The bumper attachment device includes a main body attached to a vehicle body, and elastic claws for engaging engagement holes formed in the bumper face. The elastic claw of the bumper attachment device includes an elastic beam, and a claw portion formed at the beam, and the claw portion enters the engaging hole by elastic deformation of the beam.

PRIOR ART DOCUMENT

Patent Document

Patent Document 1: Japanese Patent No. 4518406

SUMMARY OF THE INVENTION

The Subject to be Solved by the Invention

In order to prevent detachment of the bumper face to a bumper fixing portion, it is considered to increase rigidity of the beam. However, if the rigidity of the beam is increased, when the bumper face is attached to the bumper attachment device, the beam is hard to bend, so that there is a trouble of decreasing the operation ability in attachment.

The present invention has been made in view of the above background, and it is an object of the present invention to surely prevent detachment without losing operation ability.

Means for Solving the Problems

In order to solve the above problems, one aspect of the invention is a bumper attachment device (1) for attaching a bumper face (3) to a vehicle body (4), comprising a main portion (18), vehicle body connection portions (19) provided at the main portion and adapted to be connected to the vehicle body, elastic claws (20) provided at the main portion and adapted to engage engaging holes (15) formed at the bumper face, wherein the elastic claw extends from the main portion, and includes a beam (35) having elasticity and a claw portion (36) projecting from a tip portion of the beam to a side portion, the claw portion includes a check face (41) engaging a hole wall (65) of the engagement hole, and the check surface has a dent and projection shape (51).

In the aspect, by the dent and projection shape, a friction force acting between the check face and the hole wall of the engagement hole can be increased. Thereby, sliding of the check face relative to the hole wall of the engagement hole is suppressed, and it is possible to keep a state where the claw portion hangs on the hole wall of the engagement hole. In the aspect, since the rigidity of the cantilever is not increased, the operation ability at the time of assembly is not lost, and detachment of the bumper attachment device is surely prevented.

Also, in the above aspect, the dent and projection shape has a plurality of projections (54) extending parallel to each other, and each of the projections extends perpendicular to a projecting direction relative to the beam of the claw portion, and perpendicular to an extending direction of the beam.

In the aspect, since the projection engages the opening edge of the engagement hole, sliding of the check surface relative to the hole wall of the engagement hole is further suppressed.

Also, in the above aspect, the check surface extends to a base end side of the beam toward a tip end side of the claw portion.

In the aspect, when the claw portion enters the engagement hole at the time of assembly, it is possible to avoid contact between the dent and projection shape and the hole wall of the engagement hole. Accordingly, it is possible to enter the claw portion to the proper position relative to the engagement hole.

Also, in the above aspect, a surface of the dent and projection shape is preferably roughened.

In the above aspect, it is possible to increase frictional force formed between the dent and projection shape and the hole wall of the engagement hole.

In the above aspect, it is preferable to have an inclination surface (40) extending in a projection direction of the claw portion toward an end side, and a connection surface (44) smoothly connecting the inclination surface and the check surface.

In the aspect, the claw portion can smoothly enter the engagement hole.

In the above aspect, preferably, the main portion extends along the outer surface of the vehicle body, and the body connection portion is formed to project on the rear surface of the main portion and engages the engagement hole (9) of the vehicle body.

In the aspect, the body connection portion is engaged with the engagement hole of the vehicle body, so that the bumper attachment device can be attached to the front surface of the vehicle.

Also, in the above aspect, the bumper face includes a bumper face main portion (10) forming an outer surface of the vehicle body, and edge wall portions (13) projecting substantially perpendicularly from an end (11) of the bumper face main portion relative to the bumper face main portion, and the engagement holes are formed in the edge wall portion.

In this aspect, the bumper face is pushed perpendicular to the vehicle body, so that the bumper face is attached to the vehicle body through the bumper attachment device.

In the aspect, a front end portion (5) of the vehicle body includes a bumper connection portion (7) connecting to the bumper face, and a step portion (8) defining a dent portion of the vehicle body by connecting to the bumper connection portion, and the edge wall portion enters the dent portion and is located to face adjacent to the step portion.

In this aspect, by pushing the edge wall portion of the bumper face to the dent portion of the body portion, the outer surface of the bumper face is flush with the outer surface of the body portion. Thereby, design of the vehicle is enhanced.

In the above aspect, the beam portion is provide at a side surface portion (23) of the main portion, and extends from a rear surface portion (22) side to a front face portion (21) side of the main portion, and the side surface portion of the main portion includes grooves (58) receiving the edge wall portion.

In the aspect, the bumper face can be fixed to the edge wall portion by the beam of the bumper attachment device and the groove.

Advantages of the Invention

In the above structure, in the bumper attachment device, it is possible to surely prevent detachment without losing operation ability at the assembly.

EMBODIMENTS OF THE INVENTION

Figure 1:
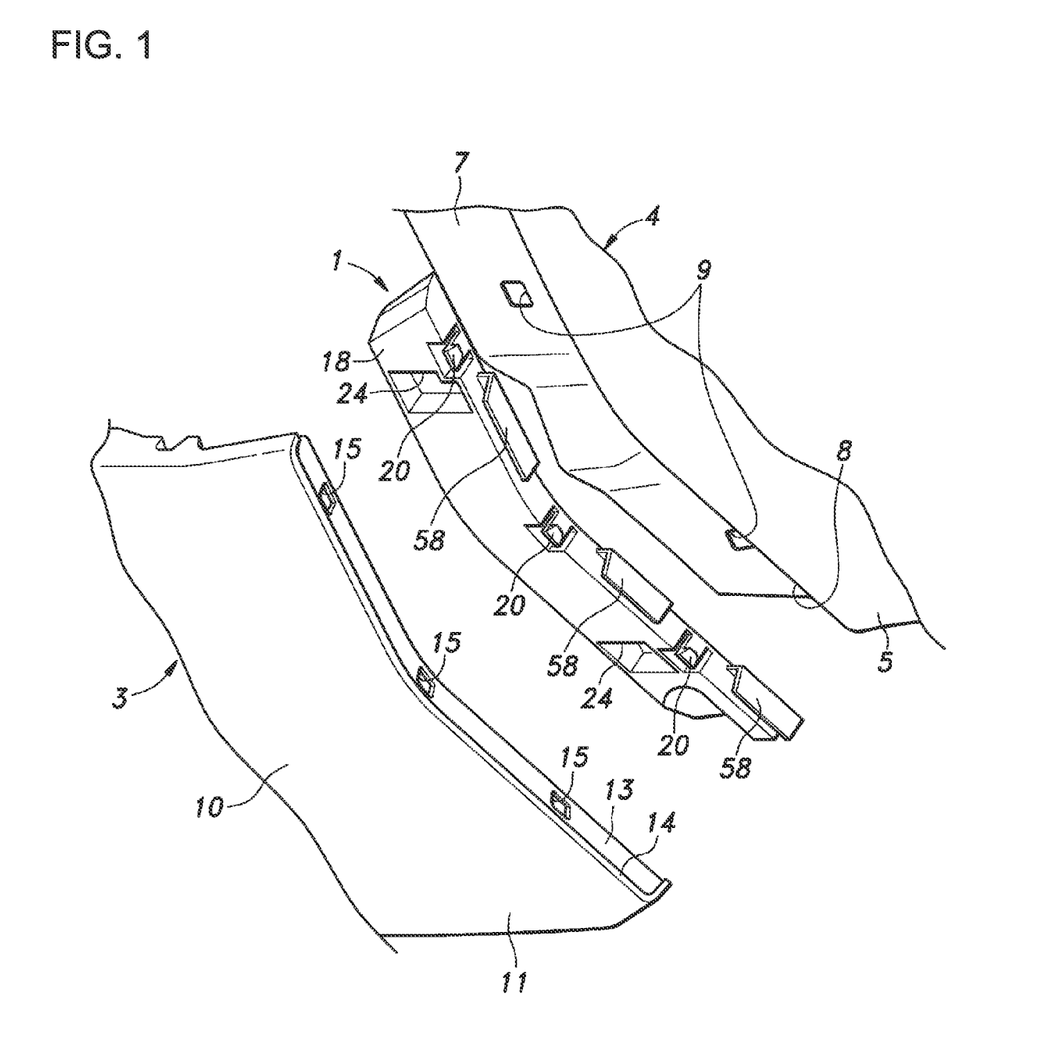
FIG. 1 is an exploded perspective view showing an attachment structure of a bumper face to a front fender using a bumper attachment device of the present invention.
Figure 2:
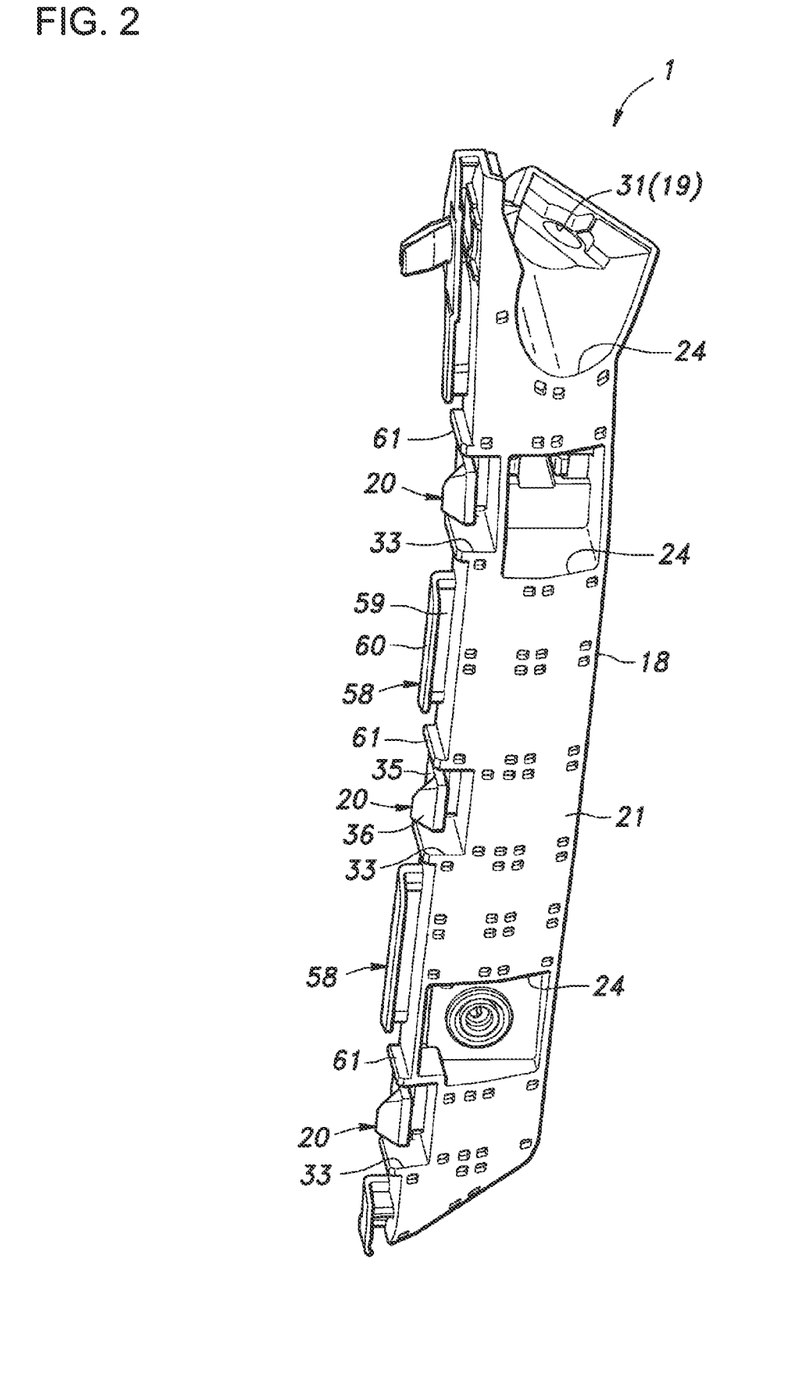
FIG. 2 is a perspective view showing the bumper attachment device.
Figure 3:
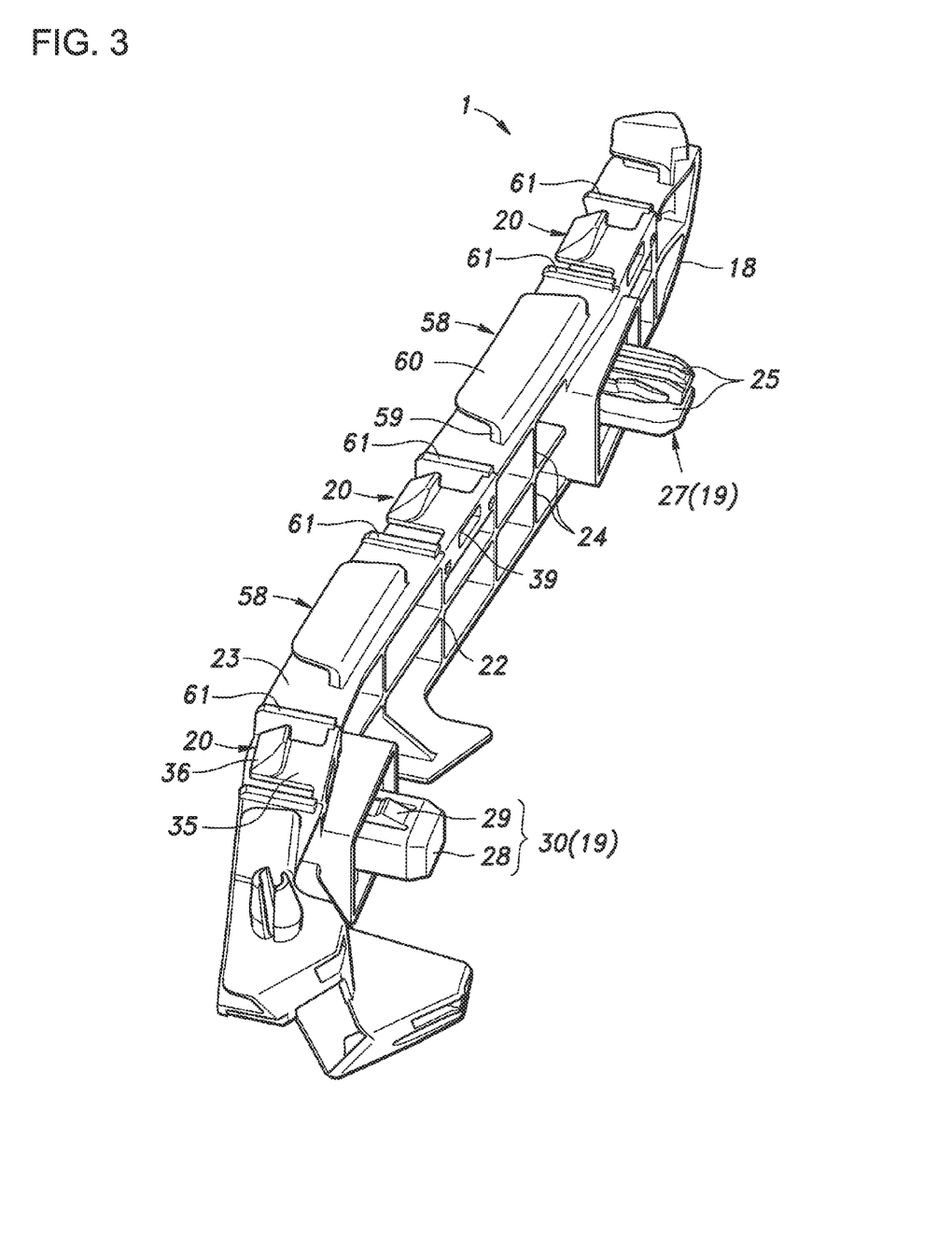
FIG. 3 is a perspective view showing the bumper attachment device.
Figure 4:
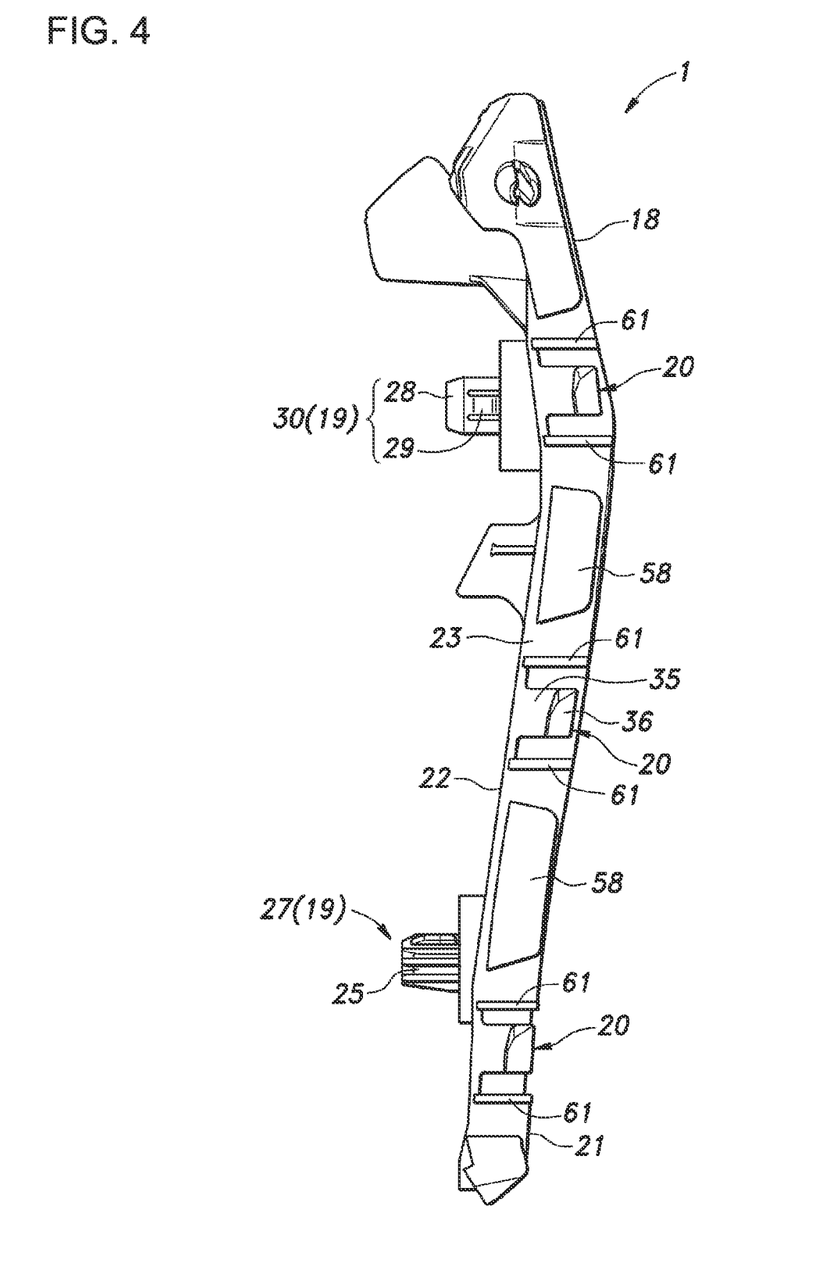
FIG. 4 is a perspective view showing the bumper attachment device.
Figure 5:
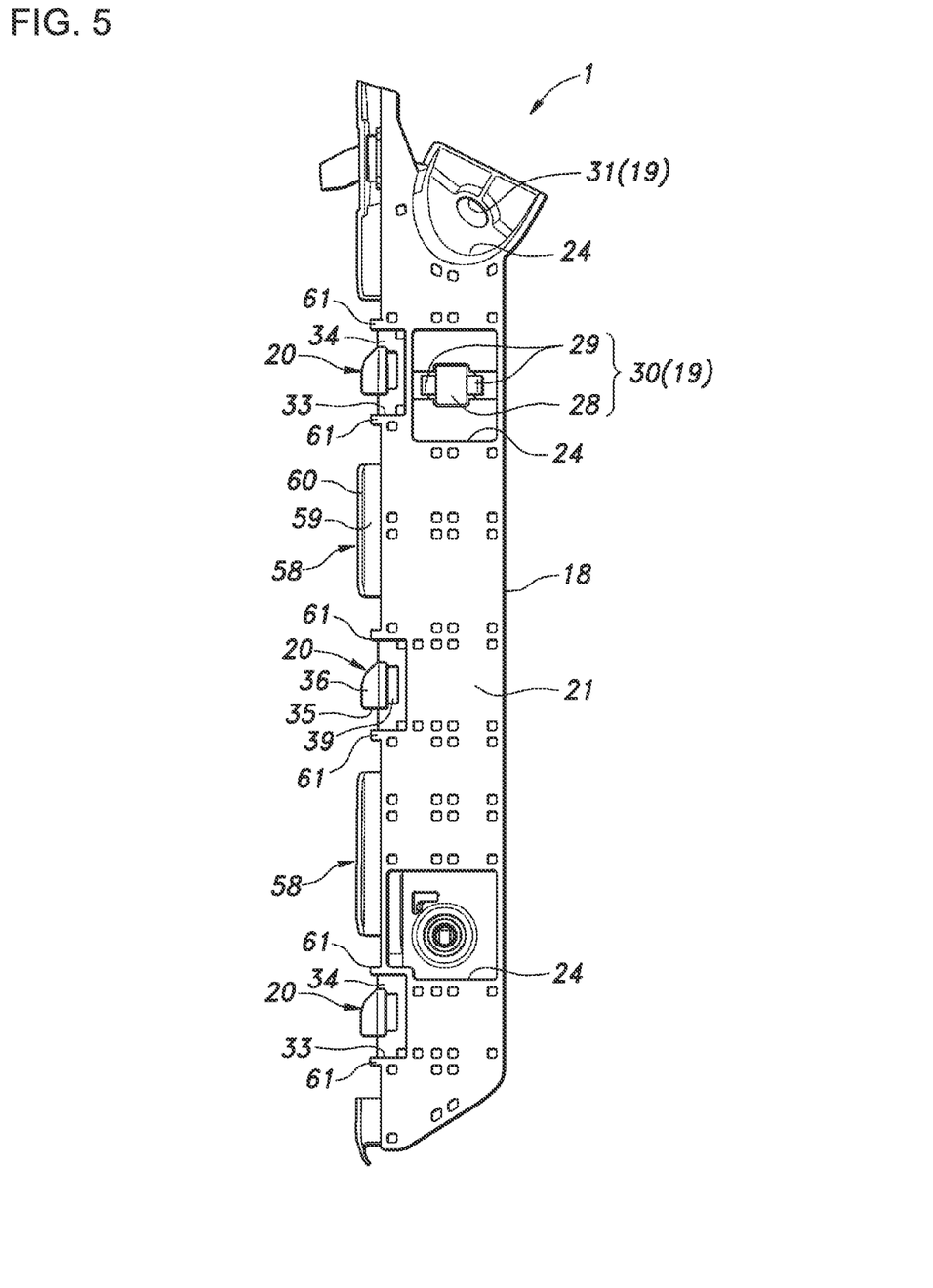
FIG. 5 is a plan view showing the bumper attachment device.

Hereinafter, with reference to the drawings, embodiments of the bumper attachment device 1 of the invention will be explained. In FIG. 1, the bumper attachment device 1 is used to attach a bumper face 3 to a vehicle body. The bumper face 3 may be either one of a front bumper face and a rear bumper face. In the following explanation, an example of the bumper attachment device 1 where the bumper face 3 as the front bumper face is attached to a front fender 4 as a vehicle.

The front fender 4 which is a part of the vehicle forms front portions of left and right side portions of the vehicle. The front fender 4 is formed of a steel plate. A front end 5 of the front fender 4 is provided with a bumper connection portion 7 connected to the bumper face 3. The bumper connection portion 7 is dented through a step portion 8 at an inside in the vehicle width direction relative to other portions of the front fender 4. Namely, the bumper connection portion 7 and the step portion 8 define a dent. The bumper connection portion 7 of the vehicle extends along a front edge of the front fender 4. The bumper connection portion 7 is formed with a plurality of engagement holes 9 penetrating therethrough in a thickness direction.

The bumper face 3 is a member covering a front side of the front bumper extending in the left and right directions of the front end 5 of the vehicle. The bumper face 3 includes a bumper face main portion 10 in a plate shape, and an edge wall portion 13 provided at an end 11 of the bumper face main portion 10. The bumper face 3 is formed of a resin material. The bumper face main portion 10 extends in the left and right directions, and both end portions bend in the rear direction. The left and right ends 11 of the bumper face main portion 10 face, from an outer side, the bumper connection portion 7 of the front fender 4 at the left and right corresponding thereto. The left and right of the end 11 of the bumper face main portion 10 extend along the step portion 8, and are connected to the bumper connection portion 7. The edge wall portion 13 projects about perpendicularly from an edge 14 of the bumper face main portion 10 to a rear side of the bumper face main portion 10. Namely, the edge wall portion 13 enters the dent portion of the vehicle. The respective portions of the edge wall portion 13 provided at the left and right of the end face the step portion through a small gap. Namely, the wall portion 13 is adjacent to the step portion. The respective portions of the wall portion 13 provided at the left and right of the end 11 are formed with a plurality of engaging walls 15.

The bumper attachment device 1 is connected to the bumper connection portion 7, and by engaging the edge wall portion 13 of the bumper face 3, the bumper face 3 is fixed to the front fender 4.

As shown in FIG. 1 and FIGS. 2-5, the bumper connection device 1 includes a main portion 18, body connection portions 19 connecting with the front fender 4, and elastic claws 20 engaging the bumper face 3. The bumper attachment device is formed of resin.

The main portion 18 is formed with an elongated shape in a cubic form, The main portion 18 includes an outer surface portion 21 forming a main face, a rear surface portion 22 formed at a side opposite to the front surface portion 21, and side face portions 23 extending generally perpendicularly to the rear face portion 22 and the front face portion 21 and also extending in the longitudinal direction of the main portion 18. Thickness reduce portions 24 are formed at appropriate positions of the rear face portion 22 and the front face portion 21.

The body connection portions 19 are plural portions formed at the rear face portion 22 of the main portion 18. Some of the body connection portions 19 may be first connection portions 27, for example, having a plurality of open pieces 25 projecting with a space on the rear surface portion 22. Namely, the body connection portion 19 preferably has projections. The plurality of open pieces 25 opens respectively with respect to each other by inserting a pin or screw between the open pieces. Some of the body connection portions 19 may be second connection portions 30 each having a leg portion 28 projecting from the rear face portion 22 and a claw portion 29 projecting in a side direction with respect to the leg portion 28. The claw portion 29 has elasticity and is provided to be able to proceed and recede sideward relative to the leg portion 28. Also, some of other body connection portions 19 may be third connection portions 31 which are through holes. Connecting members for connecting the main body portion 18 to the front fender 4 are installed in the third connection portions 31. The connecting members may be, for example, fastener or screws connecting to the third connecting portions 31 penetrating through the front fender 4.

A plurality of elastic claws 20 is formed along an elongated direction of the main portion 18 on one of the side face portions 23. Each of the elastic claws 20 is formed in each of a plurality of dents 33 formed in the side face portions 23 of the main portion 18. The dent 33 is dented from a side surface portion 23 of the main portion 18 inward of the main portion 18, and opens at the front surface portion 21. An end on the rear face portion 22 of the dent 33 includes an end face 34 facing the front face portion 21. The plurality of dents 33 is arranged to be spaced apart from each other along an extending direction of the main portion 18. Each elastic claw 20 is arranged in each of the dents 33 corresponding thereto, and is arranged along the extending direction of the main portion 18 to be spaced apart from each other. Each elastic claw 20 includes a beam 35 (cantilever) extending from the end face 34 of the dent 33 to the front face portion 21, and a claw portion 36 projecting from a front end of the cantilever to an outer side (side direction) relative to the main portion 18.

The cantilever is a plate piece having a parallel outer surface relative to the side surface portion 23 of the main portion 18. The outer surface of the cantilever is arranged on a plane substantially same as the side surface portion 23 of the main portion 18. The cantilever has elasticity, and can deform in the projecting direction of the claw portion 36 and a direction opposite to the projecting direction. Each end face 34 of each dent 33 includes a through hole 39 penetrating through a thickness direction. The through hole 39 reduces rigidity of the end face 34, and facilitates swinging movement of the cantilever. The through hole 39 preferably extends along an inner edge of a base portion of the cantilever.

Figure 6:
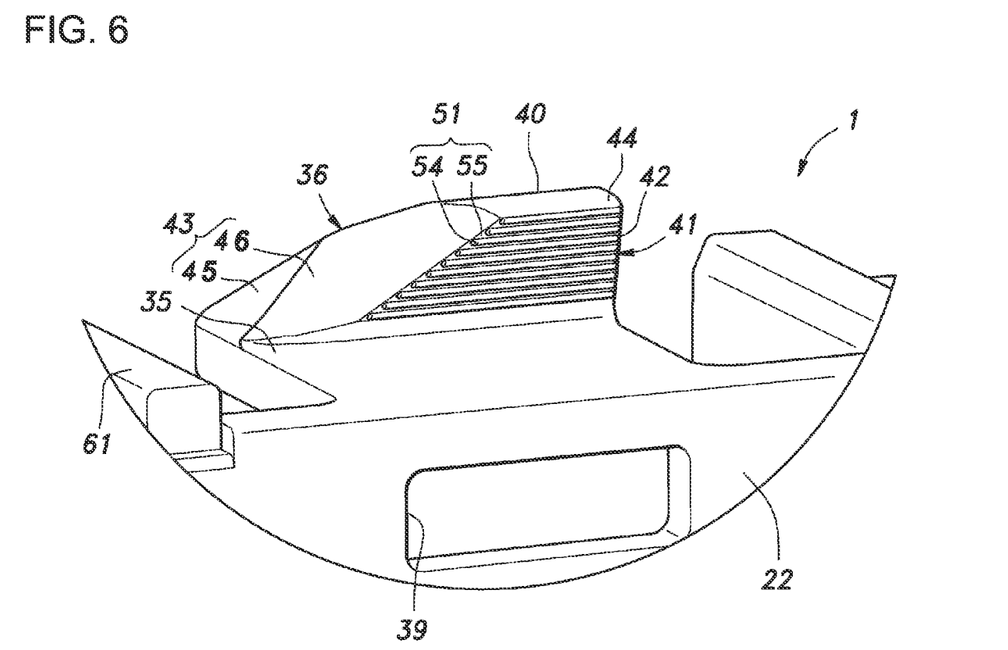
FIG. 6 is a perspective view showing a check face of a claw portion.

As shown in FIG. 6, the claw portion 36 includes an inclined surface 40 at a tip side of the cantilever, and a check surface 41 at a base end side of the cantilever. The inclined surface 40 is a plane surface extending from the end side of the outer surface of the cantilever to the base end side in the direction of projection of the claw portion 36, Namely, the check surface 41 is a face connecting the inclined surface 40 and an outer surface of the cantilever, and is provided on the base end side of the cantilever relative to the inclined surface 40. The check surface 41 may be arranged substantially perpendicularly to the cantilever. The claw portion 36 includes, on both ends. a first side portion 42 and a second side portion 43 opposite to each other. The first side portion 42, the second side portion 43 are connected respectively to the inclined surface 40, the check surface 41 and the cantilever. The second side portion 43 includes a first surface portion 45 formed on the base end side of the claw portion 36, and a second surface portion 46 formed on a tip side of the claw portion 36. The first surface portion 45 and the second surface portion 46 incline to the first side portion 42 toward the tip side of the claw portion 36. An inclination angle of the second surface portion 46 toward the first side portion 42 is set greater than an inclination angle of the first surface portion 45 to the first side portion 42. By the inclination of the second side portion 43, the inclination surface 40 and the check surface 41 become narrow in width to the end side of the claw portion 36. A border (ridge portion) between the inclined surface 40 and the check surface 41 is smoothly connected by a connection surface 44. The connection surface 44 is preferably a curved surface.

In the present embodiment, the check surface 41 extends toward the tip side of the claw portion 36 at the base side of the cantilever. Namely, the check surface 41 inclines at the base side of the cantilever. In other words, the check surface 41 overhangs relative to the outer surface of the cantilever, and forms an acute angle relative to the outer surface.

The check surface 41 includes a plurality of dent and projection shapes 51. The dent and projection shapes 51 include at least one of a plurality of projections projecting relative to a standard surface of the check surface 41 and a plurality of dents denting relative to the standard surface.

The plurality of dents and projections may be formed independently, or may be formed continuously. The plurality of dents and projections may be formed regularly to have a desired shape with respect to the check surface 41, for example parallel to each other or in a grid shape. The size and shape of the respective projections and dents may be different from each other. The outer surfaces of the dents and projections may be roughened. For example, the outer surfaces of the dents and projections may be roughened by applying roughening processing, such as blast processing or texture treatment on an outer surface of the mold forming the bumper attachment device 1.

In the present embodiment, preferably, the dent and projection shapes 51 are projections 54 which are a plurality of projections extending respectively parallel to each other and projecting on the check surface 41. Preferably, the projections 54 respectively extend in a direction perpendicular to the projecting direction relative to the cantilever of the claw portion 36, and perpendicular to the extending direction of the cantilever. Between the adjacent projections 54, a groove 55 which is a dent extending parallel to the projections 54 is formed. In other embodiment, preferably, the dent and projection shapes 51 are a plurality of grooves 55 dented on the check surface 41.

As shown in FIG. 1 to FIG. 5, on the side surface portion 23 provided on a side where the elastic claw 20 of the main portion 18 is formed, grooves 58 for receiving the edge wall portion 13 of the bumper face 3 are formed. The groove 58 is defined by the side surface portion 23 of the main portion 18, a plurality of bottom wall portions 59 projecting sideward from the side surface portion 23, and a plurality of vertical wall portions 60 extending respectively from the tip end of the bottom wall portion 59 to a front surface portion 21 side of the main portion 18. The groove 58 opens toward a front face side of the main portion 18, and extends intermittently in the longitudinal direction. Preferably, the vertical wall portions 60 incline inwardly toward the tip end side.

On the side surface portion 23 of the main portion 18, a plurality of projecting abutment portions 61 is formed. The projecting abutment portion 61 is, for example, a projection extending from a rear side of the main portion 18 to a front side. Preferably, the projecting abutment portion 61 is provided along an open edge toward the side surface portion 23 of each of the dents 33. The projection end of the projecting abutment portion 61 is located on the main portion 18 side more than the inner surface side of the vertical wall portion 60.

Next, an assembling structure and assembling method of the front fender 4 and the bumper face 3 using the bumper attachment device 1 are explained. First, to the plurality of engagement holes 9 provided in the bumper connection portion 7 of the front fender 4, the corresponding body connection portions 19 of the bumper attachment device 1 are engaged, so that the bumper connection portion 7 of the front fender 4 is connected to the bumper attachment device 1. When the first connection portion 27 is engaged with the engagement hole 9, the plurality of open pieces 25 are opened by inserting pins or screws between the plurality of open pieces 25 from the front surface portion 21 side of the main portion 18 of the bumper attachment device 1. Thereby, the first engagement portion 29 is prevented from disengagement to the engagement hole 9. Also, the second engagement portion 30 is engaged with the engagement hole 9 by inserting the leg portion 28 to the engagement hole 9. Namely, the projections of the body connection portions 19 are engaged with the engagement holes 9.

In the state that the front fender 4 is engaged with the bumper attachment device 1, in the bumper connection portion 7, the bumper attachment device 1 extends along the step 8 of the front fender 4. The bumper attachment device 1 is arranged such that the side surface portion 23 where the elastic claws 20 and the grooves 58 are provided faces the step portion 8 through the gap. The grooves 28 open in a direction opposite to a direction of the bumper connection portion 7.

Figure 7:
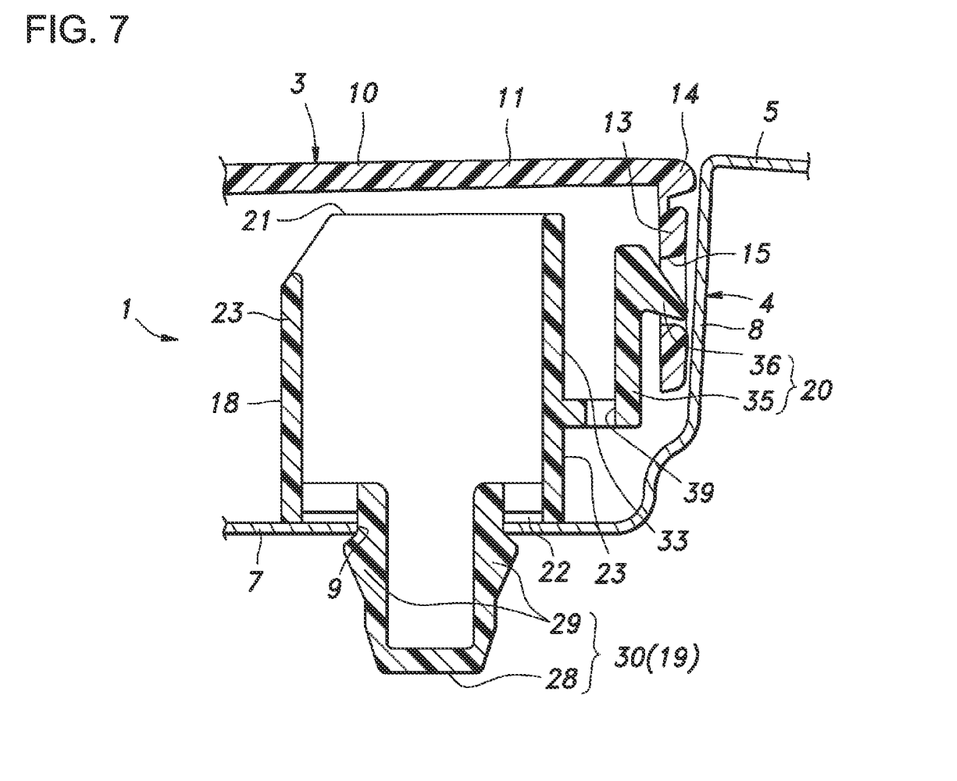
FIG. 7 is a sectional view showing an attachment structure of the bumper face to a front fender using the bumper attachment device.
Figure 8:
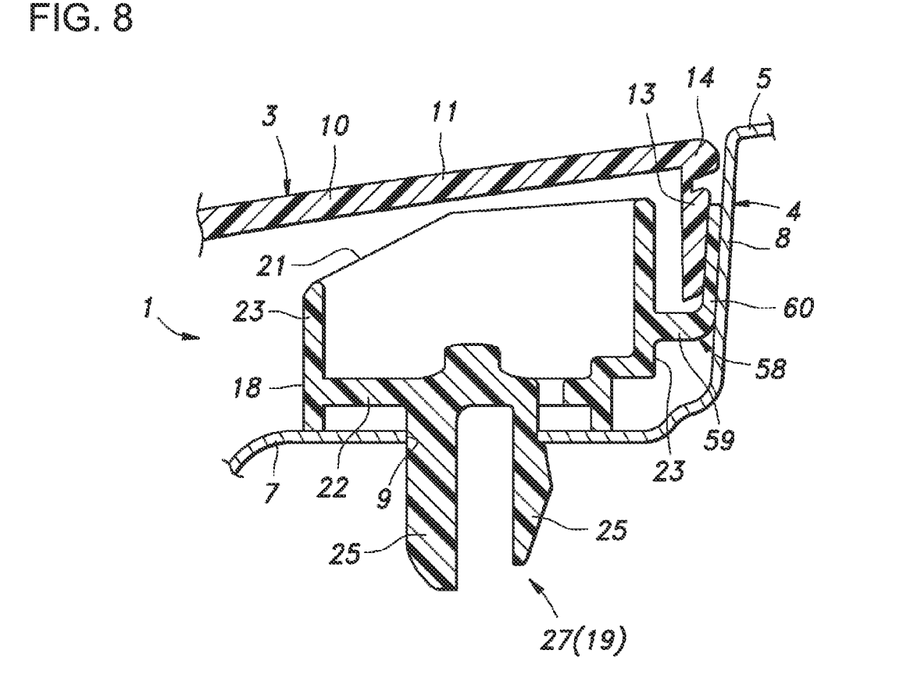
FIG. 8 is a sectional view showing an attachment structure of the bumper face to the front fender using the bumper attachment device.
Figure 9:
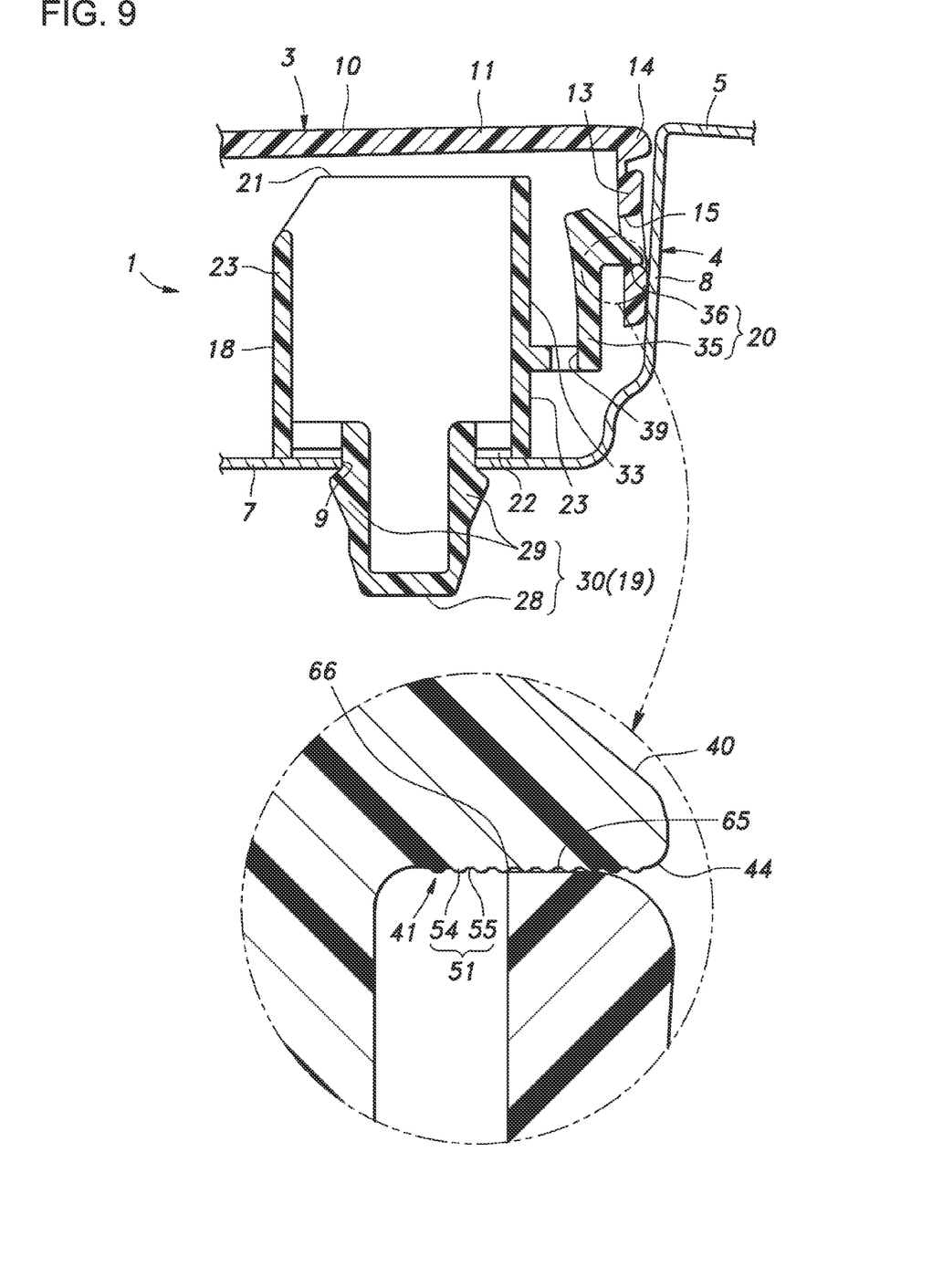
FIG. 9 is a sectional view showing an attachment structure of the bumper face to the front finder using the bumper attachment device in a state that a removing force is applied to the bumper face.

Next, as shown in FIGS. 7-9, the edge wall portion 13 provided at the end 11 of the bumper face main portion 10 is entered to the groove portions 58 of the bumper attachment device 1, so that the bumper attachment device 1 is engaged with the bumper face 3. At this time, the edge wall portion 13 abuts the respective claw portions 36 of the bumper attachment device 1, and presses the claw portions 36 to the groove portion 33 side. Thereby, the cantilever elastically deforms and inclines inside the groove portions 33. Thereafter, along with the movement into the groove portions 58 of the edge wall portion 13, the tip portions of the claw portions 36 move on the surface of the edge wall portion 13 and arrive at the engagement holes 15. The engagement hole 15 is defined by a hole wall 65. When the claw portions 36 arrive at the engagement holes 15, the cantilevers return and the claw portions 36 enter the engagement holes 15. Thereby, the check surfaces 41 of the claw portions 36 face the hole walls 65 of the engagement holes 15. Namely, the elastic claws 20 engage the engagement holes 15. At this time, it is good that the extending direction of the cantilever is substantially parallel to the insertion direction of the edge wall portion 13. In a state that the edge wall portion 13 is received in the groove portions 58, the edge wall portion 13 is held by the vertical wall portions 60 and the abutting portions 61 shown in FIG. 3, and is set in position.

As shown in FIG. 7 to FIG. 9, in a state that the bumper attachment device 1 is engaged with the bumper face 3, the edge wall portion 13 at the left and right end portions 11 of the bumper face main portion 10 faces the step portion 8 of the front fender 4. The edge portion 14 of the bumper face main portion 10 faces the boundary between the outer surface of the front fender 4 and the step portion 8. The bumper face main portion 10 is arranged to be substantially flush with the outer surface of the front fender 4.

Next, the operation of the bumper attachment device 1 when an extraction force is applied to the bumper face 3 is explained. Herein, the extraction force is a force applied in a direction to extract the bumper face 3 from the bumper attachment device 1, and is applied outside of the front fender 4 along the edge wall portion 13 of the bumper face 3. When the extraction force is applied to the bumper face 3, the edge wall portion 13 moves to the extraction direction, and the hole wall 65 of the engagement hole 15 abuts the connection surface 44 provided at the tip end of the claw portion 36. Thereafter, when the edge wall portion 13 further moves in the extraction direction, the hole wall 65 pushes the connection surface 44 of the tip portion of the claw portion 36, and the claw portion 36 rotates and the cantilever elastically deforms to incline to the dent 33. Thereby, an angle between the check surface 41 of the claw portion 36 and the hole wall 65 of the engagement hole 15 becomes small. At this time, the claw portion 36 moves, at the connection surface 44, on the hole wall 65 of the engagement hole 15.

Thereafter, when the edge wall portion 13 further moves to the extraction direction, the claw portion 36 further rotates, so that the dent and projection shape 51 of the check surface 41 of the claw portion 36 abuts the hole wall 65 of the engagement hole 15. By the abutment of the dent and projection shape 51 against the hole wall 55 of the engagement hole 15, a friction force between the check surface 41 of the claw portion 36 and the hole wall 65 of the engagement hole 15 increases, so that the movement of the claw portion 36 relative to the hole wall 65 is suppressed. At this time, the dent and projection shape 51 bites the corner portion 66, so that the friction force between the hole wall 65 of the engagement hole 15 and the opening surface increases. Also, the dent and projection shape 51 engages the corner portion 66 between the hole wall 65 of the engagement hole 15 and the opening, so that the movement of the claw portion 36 relative to the hole wall 65 is further suppressed. Especially, when the dent and projection shape 51 has the projections 54, since an area where the dent and projection shape 51 engages the corner portion 66 increases, the movement of the claw portion 36 relative to the hole wall 65 is further suppressed.

Since the movement of the claw portion 36 relative to the hole wall 65 is suppressed, the claw portion 36 is hardly disengaged from the engagement hole 15, so that disengagement of the bumper face 3 from the bumper attachment device 1 for the removal force is hard.

Hereinafter, the advantages of the bumper attachment device are explained. When the extraction force is applied to the bumper face 3, the dent and projection shape 51 of the check surface 41 at the claw portion 36 of the elastic claw 20 engages the hole wall 65 of the engagement hole 15, so that the friction force operating between the check surface 41 and the hole wall 65 increases, so that the sliding movement of the claw portion 36 relative to the hole wall 65 is suppressed. Accordingly, the bumper face 3 is hardly removed, and the detachment of the bumper attachment device 1 is surely prevented. Also, the dent and projection shape 51 engages the corner portion 66 between the hole wall 65 of the engagement hole 15 and the opening, so that the sliding movement of the claw portion 36 relative to the hole wall 65 is further suppressed. Especially, in case the dent and projection shape 51 has the projections 54, since the area at the portion where the dent and projection shape 51 engages the corner portion 66 increases, the sliding movement of the claw portion 36 relative to the hole wall 65 is further suppressed. Accordingly, the friction force acting between the check face 41 and the corner portion 66 is increased. Accordingly, the sliding of the check face 41 relative to the engagement hole 15 is suppressed, and it is possible to keep a state where the check face 41 hangs on the corner portion 66. Thus, the bumper face 3 is hardly removed, and it is possible to surely prevent the detachment of the bumper attachment device 1. In this structure, it is not necessary to increase the rigidity of the cantilever in order to increase the resisting force to the extraction force. Thus, it is not required to increase a force required to insert the elastic claw 20 to the engagement hole 15, and the operation ability at the time of assembly is not lost.

Also, in the present embodiment, the dent and projection shape 51 is formed of a plurality of projections 54 which extends perpendicular to the projecting direction relative to the cantilever and perpendicular to the extending direction of the cantilever. Therefore, the extending direction of the projections 54 and the extending direction of the corner portion 66 of the engagement hole 15 are parallel to each other, so that it is possible to increase engaging area of the projections 54 and the corner portion 66. Thereby, sliding between the check face 41 and the engagement hole 15 is further suppressed.

Also, in the present embodiment, the outer surface of the dent and projection shape 51 is roughened. Thereby, friction formed between the dent and projection shape 51 and the hole wall 65 of the engagement hole 15 is increased. Accordingly, sliding between the check surface 41 and the engagement hole 15 is further suppressed.

Further, the inclination surface 40 of the claw portion 36 of the elastic claw 20 of the bumper attachment device 1 and the check face 40 are connected smoothly by the connection surface 44. Thereby, at the time of assembly of the bumper face 3, the claw portion 36 can smoothly enter the engagement hole 15. Therefore, the assembly can be made easily. Also, the check face 41 of the claw portion 36 extends to the base end side of the cantilever toward the tip side of the claw portion 36. Accordingly, when the claw portion 36 enters the engagement hole 15 at the time of assembly, it is possible to prevent contact of the dent and projection shape 51 with the hole wall 65 of the engagement hole 15. Thus, the claw portion 36 can enter to the suitable position in the engagement hole 15. Accordingly, the assembly can be made easily.

As above, the explanation of the concrete embodiments is completed, but the present invention is not limited to the above embodiments, and can be modified widely. In the present embodiment, the beam 35 (cantilever) of the elastic claw 20 extends from the rear surface portion 22 side of the main portion 18 to the front surface portion 21 side, but in another embodiment, a cantilever may extend from the front face portion 21 side of the main portion 18 to the rear surface portion 22 side. In this case, the check surface 41 of the claw portion 36 may be provided on the tip side of the cantilever relative to the inclination surface 40, i.e. on the rear surface 22 side of the main portion 18.

Also, in the present embodiment, the beam 35 is a cantilever extending from the rear surface 22 side to the front surface portion 22 side of the main portion 18, but in another embodiment, the beam 35 may be a double side beam. In this case, the double side beam is provided in the dent portion 33 to connect the rear surface portion 22 side and the front surface side 21 side of the main portion 18. Also, the double side beam may be formed to elastically deform in a direction opposite to the projection direction of the claw portion 36.

The dent and projection shape 51 may be formed at least partially on the check surface 41, or formed entirely on the check surface 41. The dent and projection shape may be set appropriately according to a shape of the hole wall 65 and the corner portion 66. For example, the dent and projection shape 51 may include dents engageable with the corner portion 65. Also, the tip portion of the projection in the dent and projection shape is preferably formed sharply. Accordingly, the projection of the dent and projection shape 51 easily bites the hole wall 65 of the engagement hole 15, so that the sliding of the check surface 41 relative to the hole wall 65 is further suppressed. The projection of the dent and projection shape 51 may be formed, preferably, with a circular column shape or rectangular column shape with a sharp tip. Also, in order to prevent sliding of the hole wall 65 with the check face 41, the dent and projection shape may be formed at the hole wall 65, or the hole wall 65 may be roughened.

In the present embodiment, the bumper attachment device 1 is attached to the front fender 4 of the vehicle, in another embodiment, and the bumper attachment device 1 may attach the bumper face to a rear fender of the vehicle. Also, in a further embodiment of the invention, the bumper attachment device 1 may attach the bumper face 3 to a bracket provided on a vehicle.

EXPLANATION OF NUMERALS

1: Bumper attachment device
3: Bumper face
4: Front fender (vehicle body)
5: Front end portion
7: Bumper connection portion
8: Step portion
9: Engagement hole
10: Bumper face main portion
11: End
13: Edge wall portion
15: Engagement hole
18: Main portion
19: Vehicle connection portion
20: Elastic claw
21: Front surface portion
22: Rear surface portion
23: Side surface portion
31: Third connection portion
35: Beam portion
36: Claw portion
40: Inclination surface
41: Check surface
44: Connection surface
51: Dent and Projection shape
58: Groove portion
65: Hole wall

What is claimed is:

1. A bumper attachment device for attaching a bumper face to a vehicle body, comprising:
    a main portion,
    a vehicle body connection portion provided at the main portion and adapted to be connected to the vehicle body, and
    an elastic claw provided at the main portion and adapted to engage an engaging hole formed at the bumper face,
    wherein the elastic claw extends from the main portion, and includes a beam having elasticity and a claw portion projecting from a tip portion of the beam to a side portion of the beam,
    the claw portion includes a check surface adapted to engage a hole wall of the engagement hole, an inclination surface provided at a tip end side of the beam more than the check surface and extending in a projection direction of the claw portion toward a based end side of the beam, and a connection surface smoothly connecting the inclination surface and the check face, and
    the check surface has a plurality of projections and dents alternately extending parallel to each other, each of the projections extending perpendicular to the projecting direction relative to the beam of the claw portion, and perpendicular to an extending direction of the beam.

2. A bumper attachment device according to claim 1, wherein the check surface extends to the base end side of the beam toward a tip end side of the claw portion.

3. A bumper attachment device according to claim 1, wherein a surface of the dents and projections is roughened.

4. A bumper attachment device according to claim 1, wherein the main portion extends along a surface of the vehicle body, and
    the body connection portion is formed to project on a rear surface of the main portion, and adapted to engage an engaging hole formed in the vehicle body.

5. A bumper attachment device according to claim 4, wherein the bumper face includes a bumper face main portion forming an outer surface of the vehicle body, and an edge wall portion projecting substantially perpendicularly from an end of the bumper face main portion relative to the bumper face main portion, and the engagement hole is formed in the edge wall portion.

6. A bumper attachment device according to claim 5, wherein a front end portion of the vehicle body includes a bumper connection portion connecting to the bumper face, and a step portion defining a dent portion of the vehicle body by connecting to the bumper connection portion, and the edge wall portion enters the dent portion and is located to face adjacent to the step portion.

7. A bumper attachment device according to claim 5, wherein the beam portion is provided at a side surface portion of the main portion, and extends from a rear surface portion side to a front face portion side of the main portion, and the side surface portion of the main portion includes a groove receiving the edge wall portion.

8. A bumper attachment device according to claim 1, wherein the claw portion includes, on both end, a first side portion with a flat surface and a second side portion opposite to each other, which are connected respectively to the inclined surface, the check surface and the beam, the second side portion having a first surface portion formed on the base end side of the claw portion, and a second surface portion formed on a tip side of the claw portion, wherein the first surface portion and the second surface portion incline to the first side portion toward the tip side of the claw portion, an inclination angle of the second surface portion toward the first side portion being set greater than an inclination angle of the first surface portion to the first side portion, and wherein an inclination of the second side portion, the inclination surface and the check surface become narrow in width to the tip side of the claw portion.

* * * * *